Aug. 10, 1943.   A. BURKARDT   2,326,722
METHOD OF SEALING BOTTLES AND THE LIKE
Filed April 7, 1942
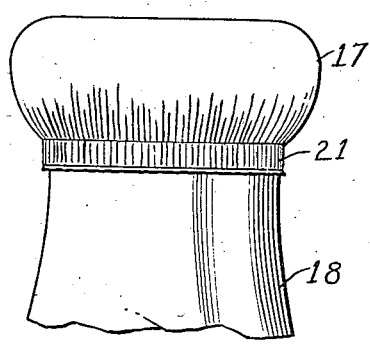
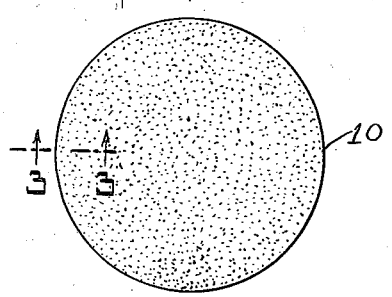
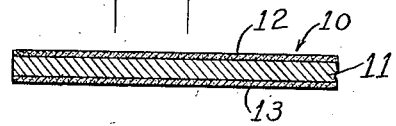
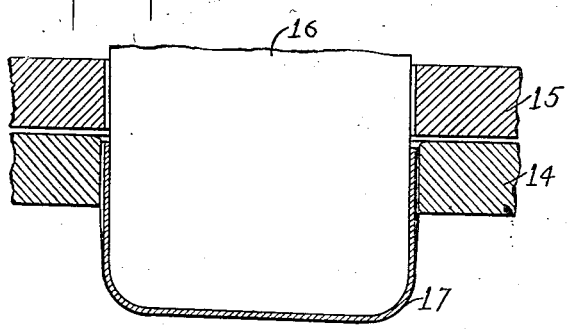
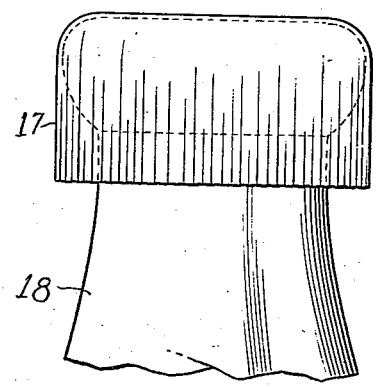
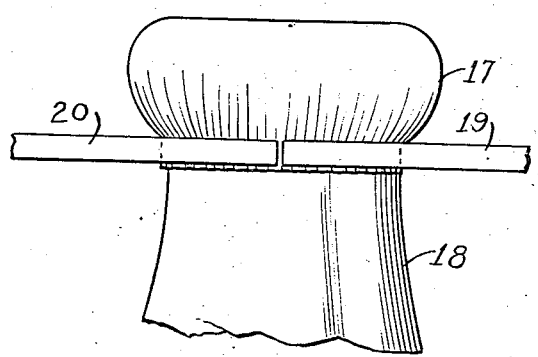
INVENTOR
ANTON BURKART
BY
ATTORNEY Patented Aug. 10, 1943

2,326,722

UNITED STATES PATENT OFFICE 2,326,722

METHOD OF SEALING BOTTLES AND THE LIKE

Anton Burkardt, New York, N. Y., assignor to Pneumatic Cap & Seal Corporation, New York, N. Y., a corporation of Delaware Application April 7, 1942, Serial No. 437,949

3 Claims. (Cl. 215—38)

The present invention relates to bottle closures or covers, and more particularly to an improved material for making such covers.

The material forming a part of the subject matter of the present invention is an improved material of the nature of a thermoplastically coated material, the base being of any suitable fibrous material, such as paper preferably per se untreated with thermoplastic material and coated with a thermoplastic material on both faces. Preferably the thermoplastic coating on one face of the material has a different zone of tackiness than the thermoplastic material on the other face.

This material is particularly advantageous in the making of bottle closures, and particularly bottle closures of the hood seal type and wherein the thermoplastic coatings upon the skirt portion of the hood seal are rendered tacky by heat and when subjected to pressure and thereafter cooled, form a band which retains the hood seal in position on the bottle without the use of wires or other auxiliary holding devices. By the use of thermoplastic coatings on both faces of the base material and which thermoplastic coatings have different ranges of temperature zones of tackiness and by applying suitable heat sealing means to embrace under pressure the skirt portion of the hood seal, heat is transferred through the outer thermoplastic coating and through the paper to the inner thermoplastic coating to render both coatings tacky, and upon withdrawal of such heat sealing means, the skirt portion of the hood seal is formed into a band, retaining the hood seal in secure position about the mouth and the neck of the bottle.

Such dually coated material is capable of having discs blanked out therefrom preparatory to preforming the hood seals and possesses a sufficient degree of yieldability to permit the hood preforming operation without undue breakage of either the base material or of the thermoplastic coatings thereon.

In the accompanying drawing,

Fig. 1 is a side elevation of a portion of the top of a milk bottle having in position thereon a closure of the hood seal type embodying the invention, and illustrating a manner in which the same is applied to the bottle;

Fig. 2 is a plan view of a blank of my improved material from which the hood seal shown in Figure 1 may be made;

Fig. 3 is a detail sectional elevation, taken on the line 3—3 of Fig. 2;

Fig. 4 is a fragmentary section of a punch and die for preforming a hood seal of the type shown in Fig. 1 from a blank such as is shown in Figures 2 and 3;

Fig. 5 is a side elevation of the upper portion of a milk bottle, having in position thereon, a pre-formed hood seal, indicated in Fig. 4; and Fig. 6 is a view, similar to Fig. 5, showing heat sealing means applied to the skirt portion of the hood seal at the stage of compacting and banding the skirt portion into a holding ring.

Referring to Figs. 2 and 3 of the drawing, 10 designates generally a blank of suitable sheet material stamped from a blank of indeterminate length and width. Such blank comprises a core 11 of suitable fibrous material such as paper and of proper gauge, the body of such fibrous material being per se untreated, but bearing on its opposite faces the thermoplastic coatings 12 and 13 respectively.

As a specific example of a preferred embodiment of the invention to provide suitable material from which blanks may be made, the blanks 10 are formed of sulphite paper of approximately .007" thick, and of a Mullen test of from 55 to 58. The outer coating 13 is made from Vinylyte or similar thermoplastic material, approximately .00025" thick, rendered tacky under heat of approximately 180° F. applied for about a one-half second. The inner coating 12 is made from Vinylyte or similar thermoplastic material, rendered tacky under heat of approximately 135° F. applied exteriorly for about a one-half second. As a commercial form of these substances available in the open market, the higher temperature thermoplastic Vinylyte is known as VYHF, and the low temperature thermoplastic Vinylyte is known as VYLF.

With the above materials, in the form described herein, when heat of approximately 350° F. is applied to the outer coating 13 for approximately one-half second, heat is transferred through the paper 10 to the inner coating 12, and such coating 12 is brought to its state of tackiness at approximately 135° F. at substantially the same instant as the coating 13.

The degree of heat applied and the length of time of application thereof are controlling factors in determining the selection of the proper thermoplastic materials to be used. For example, if the outer thermoplastic material 13 upon the application of heat becomes tacky at approximately 250° F. for approximately one-half second, then the inner thermoplastic material 12 should reach its state of tackiness at approximately 100° F.

In standard practice, the paper 10 is sulphite paper .0007" thick, with a Mullen test of 55 to 58, and for optimum results the thickness of the coatings 13 and 12 are each .00025" thick, and the directions herein given have been calculated on this basis.

From the blank 10 the hood seal is preformed, as by placing a blank 10 between the die member 14 and the hold-down member 15 of a press, see Fig. 4, whereupon a plunger 16 of proper length and diameter forces the blank 10 from between the members 14 and 15 and downwardly through the opening in the die 14.

Preferably, as shown, the resulting hood seal 17, shown in inverted position in Figure 4, and in proper position in Figure 5 on the top of a bottle 18, such as a milk bottle, has its skirt portion preformed with a series of substantially parallel linear indentations, for a purpose set forth more fully hereinafter.

Upon placing the preformed hood seal upon the bottle 18, suitable heating elements 19 and 20, advantageously electrically heated heating elements, brought to the proper temperature, as above set out, are moved inwardly under pressure toward each other, as indicated in Figure 6, the skirt portion of the hood seal 17 is subjected to pressure causing pleats to form in the skirt portion defined by the preformed parallel linear indentations, and the heat imparted by the heating elements 19 and 20 raises the temperature of the outer thermoplastic coating 13, causing heat to be transmitted through the core 11 and thence to the inner thermoplastic coating 12. Upon withdrawal of the heating elements 19 and 20 from the skirt portion of the hood seal, the thus formed pleats are bonded to one another upon both faces of the skirt portion of the hood seal, and form a band, conforming the skirt portion to the formation of the neck of the bottle and maintaining the hood seal 17 in position on the top of the bottle, as clearly shown in Figure 1.

Whereas the invention has been set forth by reference to specific forms thereof, it will be understood that many changes and modifications made be made without departing from the spirit of the invention, as defined by the appended claims.

I claim:

1. That improved method of forming and applying a hood seal, which comprises applying to a bottle mouth a sheet of fibrous material per se untreated, of a predetermined thickness and having a coating of thermoplastic material on each face thereof, the thermoplastic material on the inner face of the hood seal having a zone of tackiness at a lower temperature than the thermoplastic material on the outer face thereof, applying heat and pressure to the outer coating to thereby bring the outer thermoplastic material and the inner thermoplastic material substantially simultaneously to their respective zones of tackiness and to interfold the skirt portion of the hood about the bottle under pressure, and permitting the same to cool.

2. A hood seal for bottles comprised of a cup-shaped core of fibrous material of approximately .007" thick having on the outer face thereof a coating of thermoplastic material approximately .00025" thick and adapted to be rendered tacky under heat of approximately 350° F. applied for one-half second, and a coating on its inner face of thermoplastic material approximately .00025" thick and adapted to be rendered tacky under heat of approximately 135° F. applied for one-half second, whereby upon application of heat of approximately 350° F. for a period of approximately one-half second, both the outside and the inside coatings of thermoplastic materials are brought practically simultaneously to their respective zones of tackiness.

3. A hood seal for bottles comprised of a cup-shaped core of fibrous material of approximately .007" thick having on the outer face thereof a coating of thermoplastic material approximately .00025" thick and adapted to be rendered tacky under heat of approximately 350° F. applied for one-half second, and a coating on its inner face of thermoplastic material approximately .00025" thick and adapted to be rendered tacky under heat of approximate 135° F. applied for one-half second, the skirt portion of the hood seal being interfolded to form a band.

ANTON BURKARDT.